June 23, 1959 — E. H. ETTEMA ET AL — 2,892,069
STUD WELDING GUN
Filed April 18, 1956
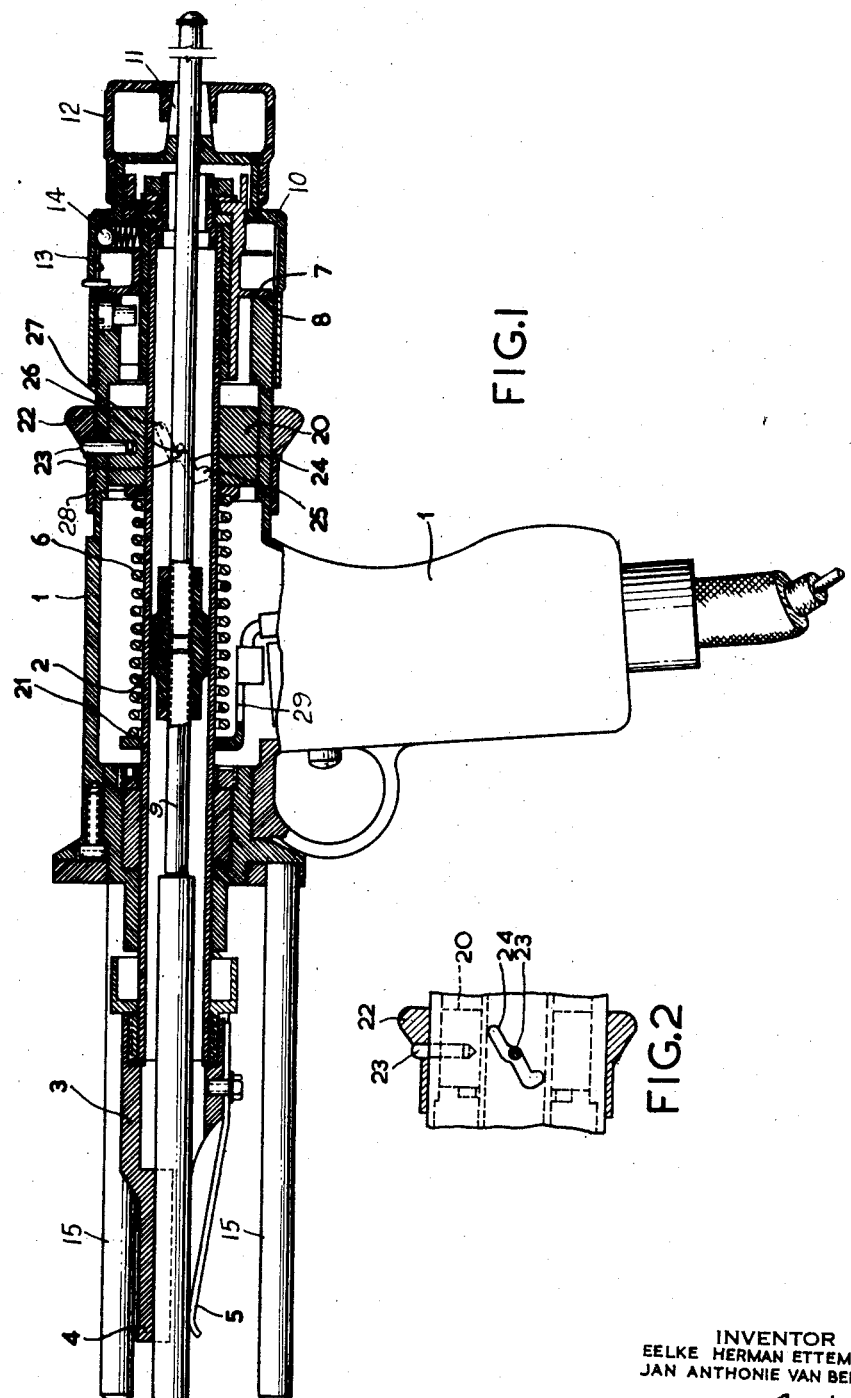
INVENTOR
EELKE HERMAN ETTEMA
JAN ANTHONIE VAN BERGEN
BY Fred M. Vogel
AGENT United States Patent Office 2,892,069
Patented June 23, 1959

2,892,069
STUD-WELDING GUN

Eelke Herman Ettema, Utrecht, and Jan Anthonie van Bergen, Eindhoven, Netherlands, assignors, by mesne assignments, to North American Philips Company, Inc., New York, N.Y., a corporation of Delaware Application April 18, 1956, Serial No. 579,076

Claims priority, application Netherlands April 18, 1955

2 Claims. (Cl. 219—98)

This invention relates to stud-welding guns and more particularly to guns of the type having a member which is movably mounted on a frame and adapted to support a stud, and which is urged toward the work piece by resilient means acting upon the frame.

A device of the above type has been described in our copending U.S. patent application Ser. No. 579,075 filed April 18, 1956.

In stud welding the force with which the stud is pressed against the work piece should be the same regardless of the position of the gun. In known stud-welding guns this condition is not fulfilled, so that the pressure of the stud on the workpiece is different depending upon whether a stud is welded to the work piece from below or from above, since in the former case the weight of the movable part counteracts the spring pressure, and in the latter case the weight co-acts with this pressure.

In accordance with the invention the above difficulties are overcome by providing means for adjusting the force exerted by the spring whereby such force will have the desired values regardless of the position of the gun during welding. The pressure of a stud on the workpiece can thus be made the same in the various positions of the gun.

According to a further feature of the invention the frame of the gun comprises a collar which is engaged by the end of the spring, and by means of a slot- and pin-construction is secured to the frame so that rotation of the collar relative to the frame moves the former in an axial direction.

In this manner the tension of the spring is adjustable in a very simple manner, independently of the position in which the studs are to be welded, which permits a uniform weld to be obtained in various positions.

According to a further feature of the invention, we preferably provide three arresting positions for the pin which enables one to readily obtain proper pressure of the stud against the work piece when the stud is in a horizontal position, in a vertical position and below the work piece, or in a vertical position and above the work piece.

In order that the invention may be readily understood and carried into effect, we shall describe the same in more detail in reference to the accompanying drawing in which;

Figure 1 is a side view partly in section of a stud-welding gun embodying the invention, and Fig. 2 is a sectional view of a portion of Figure 1 with some of the parts removed.

The gun comprises a frame 1 in which a tube 2 is supported so as to be movable in an axial direction. The tube 2, comprises a studholder 3 with a grooved part 4 and a co-acting resilient spring 5. A helical spring 6 is located between a collar 28 fixed to a collar 20 secured to the frame 1 and a collar 21 secured to the tube 2. Since a collar 7 of the tube 2 is maintained against a stop 8 of the frame 1 the spring deflection is limited. In the tube 2 is mounted a pin 9 which is secured to the tube 2 by means of a nut 10 which in turn is provided with a chuck 11 that engages about the pin 9 and can be tightened by means of a nut 12. The nut 10 has an internal rim which co-acts with spring-loaded ball 14 outside the tube 2 to lock the nut 10 in the desired position. The reference numeral 15 indicates the supports for the stud welding gun. Collar 20 is connected to a ring 22 rotatably mounted on the outer surface of frame 1 by means of two pins 23 which pass through slots 24 (only one shown) in the wall of frame 1. The slot 24 is so shaped that rotation of ring 22 and collar 20 causes the spring 6 to be compressed to a greater or less degree. The slot 24 exhibits three arresting positions 25, 26 and 27. In the position 25 of the pin 23, studs are vertically welded from below to an article, in the position 26 studs can be welded horizontally and in the position 27 vertically to an article. Current is supplied to the tube 2 and then to the pin 9 and consequently to the stud through lead-in wire 29.

While we have shown and described the preferred embodiment of our invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed is:

1. A stud-welding gun comprising a frame provided with an abutment, a part of said gun movable relatively to said frame and including a stud holder for gripping a stud, spring means for moving the latter towards a work piece, one end of said spring engaging said abutment and the other end of said spring engaging said movable part, means for displacing said abutment relative to said spring including three stations on said abutment for welding from below, above and horizontally respectively, whereby the pressure of the stud on the workpiece is substantially the same in the three welding positions with corresponding positions of the abutment.

2. A stud-welding gun comprising a frame provided with an abutment, a part of said gun movable relatively to said frame and including a stud holder for gripping a stud, spring means for moving the latter towards a work piece, one end of said spring engaging said abutment and the other end of said spring engaging said movable part, means for displacing said abutment relative to said frame in order to adjust the tension of said spring including a collar, a slot and pin arrangement connecting said collar to said frame whereby rotation of said collar relative to the frame causes said collar to be axially displaced.

References Cited in the file of this patent

UNITED STATES PATENTS

| 2,680,796 | Aversten | June 8, 1954 |
| 2,745,933 | Puckett | May 15, 1956 |
| 2,761,957 | Sholle | Sept. 4, 1956 |